CONVERTER FOR BINARY AND BINARY-CODED DECIMAL NUMBERS

Filed July 21, 1966

2 Sheets-Sheet 1

INVENTOR.
THOMAS O. HOLTEY

BY

Robert J Zinn

CONVERTER FOR BINARY AND BINARY-CODED DECIMAL NUMBERS

Filed July 21, 1966 2 Sheets-Sheet 2

INVENTOR.
THOMAS O. HOLTEY
BY
Robert J Zinn 3,505,675

CONVERTER FOR BINARY AND BINARY-CODED DECIMAL NUMBERS

Thomas O. Holtey, Newton Lower Falls, Mass., assignor to Honeywell Inc., Minneapolis, Minn., a corporation of Delaware Filed July 21, 1966, Ser. No. 566,890
Int. Cl. G08c 9/00, 11/00
U.S. Cl. 340—347 10 Claims

ABSTRACT OF THE DISCLOSURE

A BCD-to-binary and binary-to-BCD converter operates at one clock period per binary digit by successive division or multiplication by two in a plurality of identical decade registers. Simplified operation is accomplished by means of a state assignment code which makes the state of a particular flip flop in an adjacent decade register the only criteria external to a particular register which is needed to modify the division or multiplication operation within the particular register to accommodate a remainder or carry digit.

This invention relates to radix conversion and more particularly to improved method and apparatus for converting numbers between binary and binary coded decimal expressions.

The transformation between binary and binary coded decimal notation has been accomplished in the past using two clock periods per binary digit (cf. Couleur, IRE Transactions on Electronic Computers, pp. 313–316, December 1958, and U.S. Patent No. 3,026,034). While it has been suggested that operation at one clock period per binary digit could be accomplished, the straightforward combination of the test and shift steps proposed in the prior art require increased complexity in the logic and control circuits. Such arrangements not only increase the cost factor for any given machine size but, more importantly, require the cascade operation of several logic units for performing the various functions with the result that the operating speed of the conversion can be no faster than the slowest time for such cascades. Where fast machine operating cycles are required, such as 8 mc. for example, the cascaded logic steps must be held to a minimum.

The present invention provides the desired conversions between binary and binary coded decimal expressions by conversion algorithms implemented in such manner that each digit of the conversion requires only a determination of the present contents of the digit register and a single input from its immediate neighbor. The speed with which either conversion can be performed with this arrangement is further enhanced by utilizing an optimized coding for the secondary state assignments during the conversion. This coding also provides a basis for common structural elements in each conversion so that binary to binary coded decimal and binary coded decimal to binary conversions can be accomplished with the same apparatus utilizing additional control logic and appropriate switching of the input and output.

Figure 1:
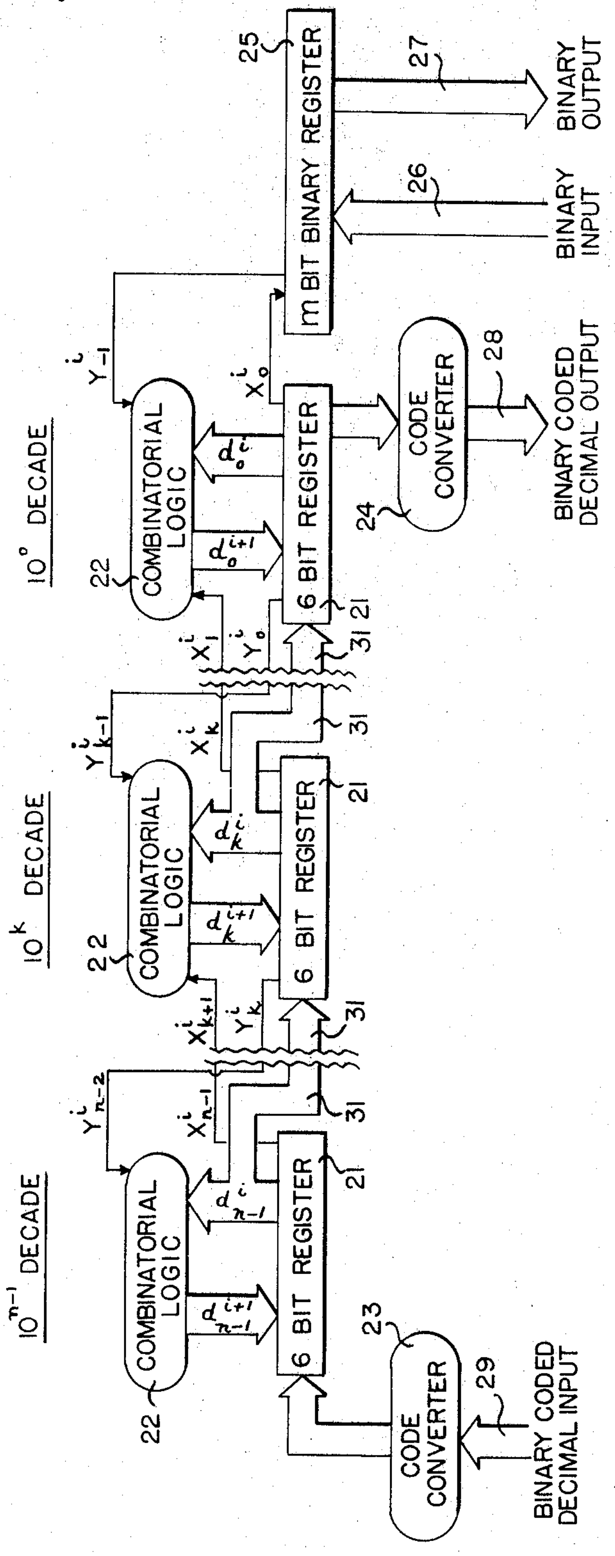
Figure 2:
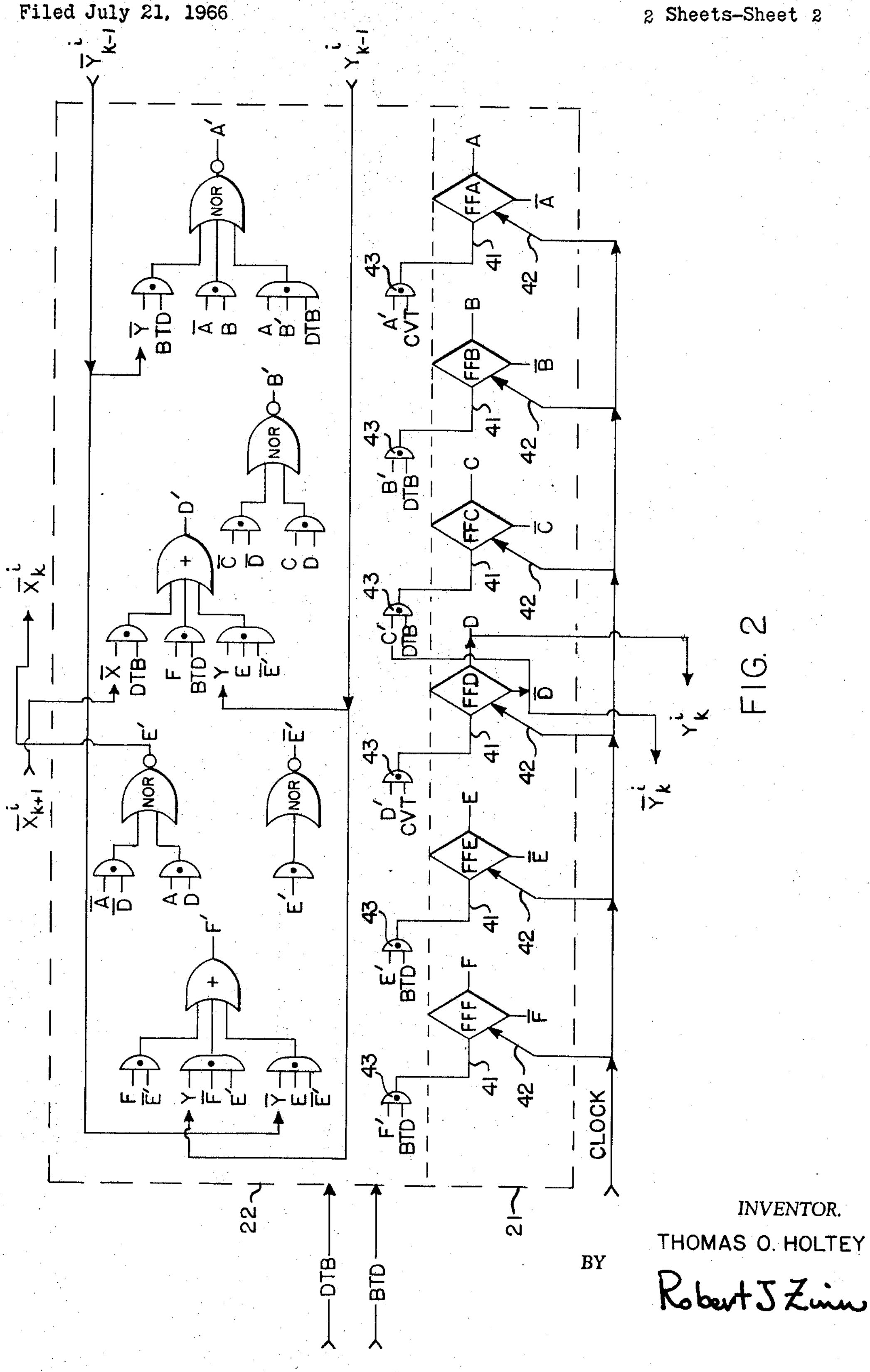

It is accordingly the principal object of the present invention to provide improved method and apparatus for radix conversion having the foregoing features and advantages. Other objects and advantages will become apparent from the following detailed description taken in conjunction with the accompanying drawings wherein:

FIG. 1 is a diagram of apparatus for $n$ digit $m$ bit conversions between binary and binary coded decimal representations; and FIG. 2 is a diagram of the digit registers and combinatorial logic as employed in the decades of FIG. 1.

The present invention performs the desired conversions by making use of either multiply or divide by two algorithms which show the basis for the required operations. Essentially the decimal to binary conversion consists of dividing the decimal number by two and storing the remainders after each step to form the binary result. The coded decimal digits appear in $n$ identical decade registers (0 to $n-1$ inclusive) and the process of division requires only a knowledge of the contents of a register and the condition of the next higher decade register, i.e. whether the number therein is odd or even. The conversion that takes place each clock period in each decade register is therefore given in Table I where the present digit, $d_k^i$, is the $k$-th digit for the $i$-th clock period which is divided by two to obtain the next digit $d_k^{i+1}$ for the $(i+1)$-th clock period in dependence on whether the content of the next higher decade $(k+1)$ is odd or even before the conversion occurs. This later condition is given by $X_{k+1}^i=1$ if and only if the the content of the $k+1$ decade is odd. The result, $d_k^{i+1}$, is thus either the quotient of division by 2 or the quotient plus five as shown:

TABLE I.—DECIMAL TO BINARY (DIVIDE BY 2)

| Present Digit $d_k^i$ | Next Digit $d_k^{i+1}$, $X_{k+1}^i=0$ | Next Digit $d_k^{i+1}$, $X_{k+1}^i=1$ |
|---|---|---|
| 0 | 0 | 5 |
| 1 | 0 | 5 |
| 2 | 1 | 6 |
| 3 | 1 | 6 |
| 4 | 2 | 7 |
| 5 | 2 | 7 |
| 6 | 3 | 8 |
| 7 | 3 | 8 |
| 8 | 4 | 9 |
| 9 | 4 | 9 |

The binary to decimal conversion consists of summing the powers of two multiplied by the binary digit for that power. In terms of the $n$ decade registers, if the binary number is entered most significant bit first into the lowest or zero decade and the contents of all decades are multiplied by two each clock period the result after $m$ clock periods will be correct if each register supplies the next higher order register with an input determined by whether the registers own contents are equal to or greater than five prior to the multiplication. The conversion that takes place each clock period in each register is therefore given in Table II where the present digit, $d_k^i$, is the $k$-th digit for the $i$-th clock period which is converted to the next digit $d_k^{i+1}$ for the $(i+1)$-th clock period in dependence on whether the content of the next lower decade $(k-1)$ is equal to or greater than five before the conversion occurs. This later condition is given by $Y_{k-1}^i=1$ if and only if the content of the $(k-1)$ decade is equal to or greater than five. The result, $d_k^{i+1}$, is thus either the product of multiplication by 2 or the product plus one as shown:

TABLE II.—BINARY TO DECIMAL (MULTIPLY BY 2)

| Present Digit $d_k^i$ | Next Digit $d_k^{i+1}$, $Y_{k-1}^i=0$ | Next Digit $d_k^{i+1}$, $Y_{k-1}^i=1$ |
|---|---|---|
| 0 | 0 | 1 |
| 1 | 2 | 3 |
| 2 | 4 | 5 |
| 3 | 6 | 7 |
| 4 | 8 | 9 |
| 5 | 0 | 1 |
| 6 | 2 | 3 |
| 7 | 4 | 5 |
| 8 | 6 | 7 |
| 9 | 8 | 9 |

Referring now to FIG. 1 the complete conversion apparatus is shown comprising $n$ decades (0 to $n-1$ inclusive each having a six bit register 21 operating with a combinatorial logic unit 22. The $(n-1)$-th decade has an input converter 23 for converting the binary coded decimal input to the minimal code used in the registers 21 as hereinafter described. Similarly the zero decade has a converter 24 for converting the minimal code in the registers 21 into binary coded decimal output. The zero decade is connected to an $m$ bit binary register 25 which has a binary input 26 and binary output 27.

Each decade receives a Y signal from the next lower order decade with the Y signal for the zero decade being the $m$ bit binary number shifted serially from the binary register 25 most significant bit first.

Each decade receives an X signal from the next higher decade with the X signal for the $n-1$ decade being a binary zero.

In operation for binary to decimal conversion an $m$ bit binary number is entered on input 26 to the binary register 25 and shifted out one bit per clock interval to the logic unit 22 of the zero decade. After $m$ clock intervals the coded decimal number in the decade registers 21 can be read out as a binary coded decimal number from output 28 of converter 24.

The operation for decimal to binary conversion enters a binary coded decimal number at input 29 into the converter 23 which stores the code representation in the decades 21. The transfer of the digits can be by serial or parallel transfer as indicated by transfer paths 31. The X signal from the zero decade is shifted serially into the binary register 25 and after $m$ clock operations the binary number in the register is the desired result. This binary number may be extracted from the output 27 as desired.

The present invention can perform the same conversion algorithms indicated in Tables I and II employing binary coded decimal representaiton in the decade registers but the cascaded logic switching times required would preclude the highest operating speeds and require a greater amount of equipment than a more optimum code. In accordance with the preferred embodiment of the invention an optimal code for the decade registers is employed which minimizes the equipment required and reduces the cascaded operating times to no greater than three thus permitting 8 mc. clock frequencies with state of the art logic components.

Referring now to FIG. 2, the details of the registers 21 and the combinatorial logic units 22 for each decade in FIG. 1 will be described. Each register 21 contains six delay flip flops FFA, FFB, FFC, FFD, FFE and FFF each of which has a logic input 41 and a clock input 42. The flip flops each respond at the clock time input on line 42 to assert the logic input on line 41 as an assertion output and a negation output. For example, FFA produces on line A the assertion of the signal on line 41 and the negation of that signal on line $\overline{A}$ whenever the clock signal on line 42 occurs.

The input signals to the flip flops on lines 41 are obtained from signals designated A′, B′, C′, D′, E′ and F′ respectively which are controlled through AND's 43 in accordance with control signals BTD and DTB. When the conversion is binary to decimal the signal BTD enables AND's 43 for flip flops FFE and FFF. When the conversion is decimal to binary the signal DTB enables AND's 43 for flip flop FFB and FFC. The AND's 43 for flip flops FFA and FFD are enabled for both signals as represented by the equation $CVT=BTD+DTB$.

The logic for producing the A′, B′, C′, D′, E′ and F′ signals is shown in FIG. 2. The source of the signals $X_k^1$, $Y_k^1$ and $Y_k^{-1}$ which are passed to adjacent stages is also shown. For clarity the interconnections are not shown but are indicated by the letter notation in which all signals are internal to a particular decade except the X and Y from adjacent decades and the common control signals DTB and BTD. As previously stated the Y signals for the $10^0$ decade is the $m$ bit binary number shifted most significant bit first from the binary register 25 of FIG. 1 and the X signal for the $10^{n-1}$ decade is a binary zero at all times.

The logic for FIG. 2 is obtained from the state assignment codes, Kanaugh maps and logic statements for the two operations as follows:

Decimal to Binary Conversion

STATE ASSIGNMENT—CODE

| | F | E | D | C | B | A |
|---|---|---|---|---|---|---|
| 0 | 0 | 0 | 1 | 0 | 1 | 0 |
| 1 | 0 | 0 | 1 | 0 | – | 1 |
| 2 | 0 | 0 | 1 | – | 0 | 0 |
| 3 | 0 | 0 | 1 | 1 | – | 1 |
| 4 | 0 | 0 | 1 | 1 | 1 | 0 |
| 5 | 0 | 0 | 0 | 0 | 1 | 0 |
| 6 | 0 | 0 | 0 | 0 | – | 1 |
| 7 | 0 | 0 | 0 | – | 0 | 0 |
| 8 | 0 | 0 | 0 | 1 | – | 1 |
| 9 | 0 | 0 | 0 | 1 | 1 | 0 |

KANAUGH MAP

B, A

| D, C | 00 | 01 | 11 | 10 | |
|---|---|---|---|---|---|
| 00 | 1 1 – 1 | 1 1 – 1 | 1 1 – 1 | 1 – 0 0 | |
| 01 | 1 1 – 1 | 1 1 1 0 | 1 1 1 0 | 1 1 1 0 | X=0 |
| 11 | 1 0 – 1 | 1 0 – 1 | 1 0 – 1 | 1 – 0 0 | |
| 10 | 1 0 – 1 | 1 0 1 0 | 1 0 1 0 | 1 0 1 0 | |

| D, C | 00 | 01 | 11 | 10 | |
|---|---|---|---|---|---|
| 00 | 0 1 – 1 | 0 1 – 1 | 0 1 – 1 | 0 – 0 0 | |
| 01 | 0 1 – 1 | 0 1 1 0 | 0 1 1 0 | 0 1 1 0 | X=1 |
| 11 | 0 0 – 1 | 0 0 – 1 | 0 0 – 1 | 0 – 0 0 | |
| 10 | 0 0 – 1 | 0 0 1 0 | 0 0 1 0 | 0 0 1 0 | |

D′, C′, B′, A′

LOGIC STATEMENTS $$\overline{A'}=\overline{A}\cdot B+A\cdot B'$$
$$\overline{B'}=\overline{C}\cdot\overline{D}+C\cdot D$$
$$C'=\overline{D}$$
$$D'=\overline{X}$$
$$E'=—$$
$$F'=—$$
$$\overline{X'}=\overline{A}\cdot D+A\cdot\overline{D}=\overline{E'}$$

Binary to Decimal Conversion

STATE ASSIGNMENT—CODE

| | F | E | D | C | B | A |
|---|---|---|---|---|---|---|
| 0 | 0 | 0 | 0 | 0 | 0 | 0 |
| 1 | 0 | – | 0 | 0 | 0 | 1 |
| 2 | 0 | 1 | 0 | 0 | 0 | 0 |
| 3 | 1 | – | 0 | 0 | 0 | 1 |
| 4 | 1 | 0 | 0 | 0 | 0 | 0 |
| 5 | 0 | 0 | 1 | 0 | 0 | 1 |
| 6 | 0 | – | 1 | 0 | 0 | 0 |
| 7 | 0 | 1 | 1 | 0 | 0 | 1 |
| 8 | 1 | – | 1 | 0 | 0 | 0 |
| 9 | 1 | 0 | 1 | 0 | 0 | 1 |

KANAUGH MAP

D, A

| F, E | 00 | 01 | 11 | 10 | |
|---|---|---|---|---|---|
| 00 | 0 0 0 0 | 0 1 0 0 | 0 0 0 0 | 0 1 0 0 | |
| 01 | 1 0 0 0 | 0 1 0 0 | 1 0 0 0 | 0 1 0 0 | Y=0 |
| 11 | – – – – | 0 – 1 0 | – – – – | 0 – 1 0 | |
| 10 | 1 – 1 0 | 0 – 1 0 | 1 – 1 0 | 0 – 1 0 | |

| F, E | 00 | 01 | 11 | 10 | |
|---|---|---|---|---|---|
| 00 | 0 – 0 1 | 1 – 0 1 | 0 – 0 1 | 1 – 0 1 | |
| 01 | 0 0 1 1 | 1 – 0 1 | 0 0 1 1 | 1 – 0 1 | Y=1 |
| 11 | – – – – | 0 1 1 1 | – – – – | 0 1 1 1 | |
| 10 | 1 0 1 1 | 0 1 1 1 | 1 0 1 1 | 0 1 1 1 | |

F', E', D', A'

LOGIC STATEMENTS $A'=Y$
$B'=—$
$C'=—$
$D=F+Y\cdot E\cdot \overline{E'}$
$E'=\overline{A}\cdot D+A\cdot \overline{D}$
$F'=F\cdot \overline{E'}+Y\cdot \overline{F}\cdot E'+\overline{Y}\cdot E\cdot \overline{E'}$
$Y'=D$

CODE CONVERTERS

The input conversion unit 23 which is required to convert the ordinary 8, 4, 2, 1 weight stages of a binary coded decimal digit to the code utilized in the registers 21 of FIGS. 1 and 2 is given as follows where 1, 2, 3 and 4 represent the flip flops associated with the 1, 2, 4 and 8 weight bits of each binary coded digit in the input 29.

KANAUGH MAP 2, 1

| 4, 3 | 00 | 01 | 11 | 10 |
|---|---|---|---|---|
| 00 | 1 0 1 0 | 1 0 – 1 | 1 1 – 1 | 1 – 0 0 |
| 01 | 1 1 1 0 | 0 0 1 0 | 0 – 0 0 | 0 0 – 1 |
| 11 | 1 0 1 0 | 1 0 1 0 | 1 0 1 0 | 1 0 1 0 |
| 10 | 0 1 – 1 | 0 1 1 0 | – – – – | – – – – |

D, C, B, A

LOGIC STATEMENTS $A=1\cdot\overline{3}\cdot\overline{4}+\overline{1}\cdot\overline{3}\cdot 4+\overline{1}\cdot 2\cdot 3\cdot\overline{4}$
$\overline{B}=2\cdot\overline{4}$
$C=\overline{3}\cdot 4+2\cdot\overline{3}+\overline{1}\cdot\overline{2}\cdot 3\cdot\overline{4}$
$D=\overline{3}\cdot\overline{4}+3\cdot 4+\overline{1}\cdot\overline{2}\cdot 3$
$E=0$
$F=0$ These logic equations are implemented by conventional logic circuits in the code converter 23 to produce the signals A, $\overline{B}$, C, D, E and F for the flip flops of registers 21 in accordance with the aforementioned state assignment code for decimal to binary conversion.

The output conversion unit 24 which is required to convert the coded representation in the registers 21 into binary coded decimal output on line 28 is given as follows where again 1, 2, 3 and 4 represent the 1, 2, 4 and 8 weight flip flops of the binary coded decimal digits.

KANAUGH MAP

D, A

| F, E | 00 | 01 | 11 | 10 |
|---|---|---|---|---|
| 00 | 0 0 0 0 | 0 0 0 1 | 0 1 0 1 | 0 1 1 0 |
| 01 | 0 0 1 0 | 0 0 0 1 | 0 1 1 1 | 0 1 1 0 |
| 11 | 0 1 0 0 | 0 0 1 1 | 1 0 1 1 | 1 0 0 0 |
| 10 | 0 1 0 0 | 0 0 1 1 | 1 0 0 1 | 1 0 0 0 |

4, 3, 2, 1

LOGIC STATEMENTS $1=A$
$2=\overline{A}\cdot F+A\cdot D\cdot\overline{E}+A\cdot\overline{D}\cdot\overline{F}+\overline{A}\cdot\overline{D}\cdot\overline{E}$
$3=D\cdot\overline{F}+\overline{A}\cdot\overline{D}\cdot F$
$4=D\cdot F$ Again, these logic equations are implemented by conventional logic circuits in the code converter 24 to produce the signals 1, $\overline{2}$, 3 and 4 for the 1, 2, 4 and 8 weight flip flops of the binary coded decimal output on line 28 in accordance with the aforementioned state assignment code for binary to decimal conversion.

From the foregoing it will be appreciated that the invention provides circuits many of which are common to both conversions and which minimize both the equipment and operating time required. While the functions of multiplying or dividing by two and conditioning the result on the state of an adjacent decade could be performed with other code representations in the decades and thus achieve the desired results, the preferred coding of the disclosed embodiment has aspects which simplify the circuits and enhance the operating speed. In particular the coding for decimal to binary conversion has identical assignments for 0–4 and 5–9 except of the D bit. The present content of a decade affects only flip flops FFA, FFB and FFC and the incoming X signal affects only FFD. The D signal thus acts as a five weight bit. For binary to decimal conversions the code assignments again are the same for 0–4 and 5–9 except for complementation of A, and D is again a five weight bit. Thus the X and Y signals for adjacent decades are derived from the D bit without scanning the stages of the entire decade.

Many modifications will occur to those skilled in the art for practicing the invention in various forms. For example the conversion of negative quantities can be accomplished using two's complement arithmetic. For a binary to decimal conversion the two's complement is taken of the input quantity entered at input 29; for decimal to binary conversions the two's complement is taken of the bits shifted into binary register 25 from the zero decade register 21. Various methods for handling the binary and decimal points can be used to extend the capacity to numbers in excess of the register capacity. Also serial and parallel shift in and out of registers is possible. Finally, the particular logic functions can be performed by devices other than those specified. For example, the term flip-flop is to be understood as covering any suitable bistable device. The invention accordingly is to be interpreted as not limited to the specific disclosure but only by the scope of the appended claims.

I claim:

1. The method of single clock period conversion of an *m* bit binary number into the binary coded decimal representation of the corresponding *n* digit decimal number comprising the steps of:

(a) entering the binary number in binary storage;

(b) shifting the binary number most significant bit first to a series of *n* decades coded to represent decimal digits the code in each decade characterized by a five weight bit;

(c) multiplying the contents of each said decade by two for each clock period; and adding a binary one from the next lower stage if and only if the present digit of said next lower stage before each such multiplication is equal to or greater than five as determined by said five weight bit; and, (d) extracting from said $n$ decades the binary coded decimal representation of the $n$ digit decimal number after $m$ clock periods of said multiplying and shifting steps (b) and (c).

2. The method of single clock period conversion of an $n$ digit binary coded decimal number into corresponding $m$ bit binary number comprising the steps of:

(a) entering a representation of said $n$ digit binary coded decimal number in $n$ coded decades the code in each decade characterized by a five weight bit;

(b) dividing the coded representation in each said decade by two to obtain a quotient and remainder;

(c) adding five to each next lower decade whenever said remainder is odd as determined by said five weight bit;

(d) shifting the binary remainder from the lowest decade into serial storage least significant bit first;

(e) repeating each clock period the division by two and shifting steps of (b), (c) and (d); and, (f) extracting the $m$ bit binary number from storage after $m$ clock periods.

3. Apparatus for converting an $m$ bit binary number to $n$ digit binary coded decimal with a single clock period per binary bit comprising:

(a) an $m$ bit binary register for storing said binary number, said register shiftable to transfer said binary number serially most significant bit first;

(b) $n$ decade registers for receiving said binary number and storing coded representations of the digits of said decimal number, said registers operating to multiply the decimal number therein by two each clock period and, if the number in the next lower stage equalled or exceeded five before each multiplying cycle, add a one; and, (c) means for extracting from said $n$ decade registers the binary coded decimal representation of said number after $m$ clock periods, said decade registers containing a coded representation of the digits of said decimal number therein such that each decade includes a flip flop stage the state of which represents a five weight bit, said flip-flop stage in each decade coupled to the next higher decade for adding said one when the number in said each decade is five or greater; said means for extracting including converting means for converting said coded representation into a binary coded decimal representation of said number.

4. Apparatus according to claim 3 in which said coded representation of the digits of said decimal number includes a flip flop stage in each decade the state of which represents a five weight bit and said flip flop stage in each decade is coupled to the next higher decade for adding said one when the number in said each decade is five or greater; and said means for extracting includes converting means for converting said coded representation into a binary coded decimal representation of said number.

5. Apparatus for converting an $n$ digit binary coded decimal number to $m$ bit binary with a single clock period per binary bit comprising:

(a) $n$ decade registers;

(b) means for entering an $n$ digit coded representation of said binary coded decimal number in the decades of said $n$ decade register;

(c) means for dividing the coded representation in each of said decades by two for each clock cycle; and adding five if the remainder from the next higher stage is odd prior to each division; and (d) an $m$ bit binary register for receiving and storing the remainder from the lowest order decade register, said means for entering including conversion means for converting said binary coded decimal number into said coded representation, said coded representation of the digits of said decimal number including a register in each decade having a flip flop stage the state of which represents a five weight bit and said flip flop stage in each decade is coupled to the next higher decade for receiving a binary one when the number in said higher decade is odd thereby representing the addition of a five to said each decade.

6. Apparatus according to claim 5 in which said means for entering includes conversion means for converting said binary coded decimal number into said coded representation, said coded representation of the digits of said decimal number including a flip flop stage in each decade the state of which represents a five weight bit and said flip flop stage in each decade is coupled to the next higher decade for receiving a binary one when the number in said higher decade is odd thereby representing the addition of a five to said each decade.

7. Apparatus for converting an $m$ bit binary number to an $n$ digit binary coded decimal with a single clock period per binary bit comprising:

(a) an $m$ bit binary register for storing said binary number, said register shiftable to transfer said binary number serially most significant bit first;

(b) $n$ decade registers each comprising flip flop stages A, D, E and F;

(c) control logic for each of said decade registers typified by the $k$-th decade for the $i$-th clock period corresponding to $$A'_k{}^i = Y^i_{k-1}$$

$$D'_k{}^i = F_k{}^i + Y^i_{k-1} \cdot E_k{}^i \cdot \overline{E'_k{}^i}$$

$$E'_k{}^i = \overline{A_k{}^i} \cdot D_k{}^i + A'_k{}^i \cdot \overline{D_k{}^i}$$

$$F'_k{}^i = F_k{}^i \cdot \overline{E'_k{}^i} + Y^i_{k-1} \cdot \overline{F_k{}^i} \cdot E'_k{}^i + \overline{Y^i_{k-1}} \cdot E_k{}^i \cdot \overline{E'_k{}^i}$$

$$Y_k{}^i = D_k{}^i$$

where the $i+1$ state of the flip flops is determined by the $i$-th state of the primed variable; and $k$ varies from 0 to $n-1$ with $$Y_{k-1}$$

defined as equal to binary one if the value in the $k-1$ decade for the $i$-th clock operation is equal to or greater than five and equal to binary zero if the value is less than five and $$Y^i_{k-1}$$

for the lowest order decade register is the binary shifted output of said binary register; and (d) conversion means operable after $m$ clock periods to produce a binary coded decimal output represented in four stages 1, 2, 3 and 4 per digit from the flips flops in said decades corresponding to $$1 = A$$

$$2 = \overline{\bar{A} \cdot F + A \cdot D \cdot \bar{E} + A \cdot \bar{D} \cdot \bar{F} + \bar{A} \cdot \bar{D} \cdot \bar{E}}$$

$$3 = D \cdot \bar{F} + \bar{A} \cdot \bar{D} \cdot F$$

$$4 = D \cdot F$$

8. Apparatus for converting an $n$ digit binary coded decimal number to $m$ bit binary with a single clock period per binary bit comprising:

(a) $n$ decade registers each comprising flip flops A, B, C and D;

(b) converting means for changing said $n$ digit binary coded decimal number represented in four stages 1, 2, 3 and 4 per digit into an $n$ digit coded representation in said flip flops A, B, C and D for each digit corresponding to $$A = 1 \cdot \bar{3} \cdot \bar{4} + \bar{1} \cdot \bar{3} \cdot 4 + \bar{1} \cdot 2 \cdot 3 \cdot \bar{4}$$

$$B = \overline{2 \cdot \bar{4}}$$

$$C = \bar{3} \cdot 4 + 2 \cdot \bar{3} + \bar{1} \cdot \bar{2} \cdot 3 \cdot \bar{4}$$

$$D = \bar{3} \cdot \bar{4} + 3 \cdot 4 + \bar{1} \cdot \bar{2} \cdot 3;$$

(c) control logic for each of said decade registers typified by the $k$-th decade for the $i$-th clock period corresponding to $$A'_k{}^i=\overline{\overline{A_k{}^i}\cdot B_k{}^i+A_k{}^i\cdot B'_k{}^i}$$

$$B'_k{}^i=\overline{\overline{C_k{}^i}\cdot D_k{}^i+C_k{}^i\cdot D_k{}^i}$$

$$C'_k{}^i=\overline{D_k{}^i}$$

$$D'_k{}^i=\overline{X^i_{k+1}}$$

$$X_k{}^i=\overline{E'_k{}^i}$$

where the $i+1$ state of the flip flops is determined by the $i$-th state of the primed variables and $k$ varies from 0 to $n-1$ with $$X^i_{k+1}$$

defined as equal to binary one if the value in the $k+1$ decade for the $i$-th clock operation is odd and a binary zero if the value is even and $$X_n{}^i$$

is binary zero for all $i$; and (d) an $m$ bit binary register for recovering and storing the binary number obtained as the $$X_0{}^i$$

output.

9. The combination for converting numbers between binary and binary coded decimal representations comprising:

(a) a binary to binary coded decimal converter including apparatus for converting an $m$ bit binary number to an $n$ digit binary coded decimal with a single clock period per binary bit comprising:

(i) an $m$ bit binary register for storing said binary number serially most significant bit first;

(ii) $n$ decade registers each comprising flip flop stages A, D, E and F;

(iii) control logic for each of said decade registers typified by the $k$-th decade for the $i$-th clock period corresponding to $$A'_k{}^i=Y^i_{k-1}$$

$$D'_k{}^i=F_k{}^i+Y^i_{k-1}\cdot E_k{}^i\cdot\overline{E'_k{}^i}$$

$$E'_k{}^i=\overline{A_k{}^i}\cdot D_k{}^i+A'_k{}^i\cdot\overline{D_k{}^i}$$

$$F'_k{}^i=F_k{}^i\cdot\overline{E'_k{}^i}+Y^i_{k-1}\cdot\overline{F_k{}^i}\cdot E'_k{}^i+\overline{Y^i_{k-1}}\cdot E_k{}^i\cdot\overline{E'_k{}^i}$$

$$Y_k{}^i=D_k{}^i$$

where the $i+1$ state of the flip flops is determined by the $i$-th state of the primed variables; and $k$ varies from 0 to $n-1$ with $$Y_k{}^i$$

defined as equal to binary one if the value in the $k-1$ decade for the $i$-th clock operation is equal to or greater than five and equal to binary zero if the value is less than five, and $$Y^i_{k-1}$$

for the lowest order decade register is the binary shifted output of said binary register; and (iv) conversion means operable after $m$ clock periods to produce a binary coded decimal output represented in four stages 1, 2, 3 and 4 per digit from the flip flops in said decades corresponding to $$1=A$$

$$2=\overline{\bar{A}\cdot F+A\cdot D\cdot\bar{E}+A\cdot\bar{D}\cdot\bar{F}+\bar{A}\cdot\bar{D}\cdot\bar{E}}$$

$$3=D\cdot\bar{F}+\bar{A}\cdot\bar{D}\cdot F$$

$$4=D\cdot F$$

(b) a binary coded decimal to binary converter including apparatus for conveterting an $n$ digit binary coded decimal number to $m$ bit binary with a single clock period per binary bit comprising:

(i) $n$ decade registers each comprising flip flops A, B, C and D;

(ii) converting means for changing said $n$ digit binary coded decimal number represented in four stages 1, 2, 3 and 4 per digit into an $n$ digit coded representation in said flip flops A, B, C and D for each digit corresponding to $$A=\underline{1\cdot\bar{3}}\cdot\bar{4}+\bar{1}\cdot\bar{3}\cdot 4+\bar{1}\cdot 2\cdot 3\cdot\bar{4}$$

$$B=2\cdot\bar{4}$$

$$C=\bar{3}\cdot 4+2\cdot\bar{3}+\bar{1}\cdot\bar{2}\cdot 3\cdot\bar{4}$$

$$D=\bar{3}\cdot\bar{4}+3\cdot 4+\bar{1}\cdot\bar{2}\cdot 3;$$

(iii) control logic for each of said decade registers typified by the $k$-th decade for the $i$-th clock period corresponding to $$A'_k{}^i=\overline{A_k{}^i\cdot B_k{}^i+A_k{}^i\cdot B'_k{}^i}$$

$$B'_k{}^i=\overline{\overline{C_k{}^i}\cdot D_k{}^i+C_k{}^i\cdot D_k{}^i}$$

$$C'_k{}^i=\overline{D_k{}^i}$$

$$D'_k{}^i=\overline{X^i_{k+1}}$$

$$\overline{X_k{}^i}=\overline{E'_k{}^i}$$

where the $i+1$ state of the flip flops is determined by the $i$-th stage of the primed variables; and $k$ varies from 0 to $n-1$ with $$X^i_{k+1}$$

defined as equal to binary one if the value of the $k+1$ decade for the $i$-th clock operation is odd and a binary zero if the value is even and $$X_n{}^i$$

in binary zero for all $i$; and, (iv) an $m$ bit binary register for receiving and storing the binary number obtained as the $$X_o{}^i$$

output, the $n$ decade registers for each said converter being the same $n$ registers of six flip flops each, A, B, C, D, E and F; and (c) additional control logic selectively operable to disable flip flops B and C for binary to binary coded decimal conversions and to disable flip flops E and F for binary coded decimal to binary conversions.

10. The combination according to claim 9 in which the same $m$ bit binary register is connected to be common to both conversions for respectively receiving the binary number input or supplying the binary number output.

References Cited

UNITED STATES PATENTS

| | | | |
|---|---|---|---|
| 3,026,034 | 3/1962 | Couleur | 235—154 |
| 3,026,035 | 3/1962 | Couleur | 235—154 |
| 3,032,266 | 5/1962 | Couleur | 235—154 |
| 3,064,894 | 11/1962 | Campbell | 235—155 |

MAYNARD R. WILBUR, Primary Examiner

J. GLASSMAN, Assistant Examiner

U.S. Cl. X.R.

235—154, 155